US012260492B2

(12) United States Patent
Wang et al.

(10) Patent No.: US 12,260,492 B2
(45) Date of Patent: Mar. 25, 2025

(54) METHOD AND APPARATUS FOR TRAINING A THREE-DIMENSIONAL FACE RECONSTRUCTION MODEL AND METHOD AND APPARATUS FOR GENERATING A THREE-DIMENSIONAL FACE IMAGE

(71) Applicant: Beijing Baidu Netcom Science Technology Co., Ltd., Beijing (CN)

(72) Inventors: Di Wang, Beijing (CN); Ruizhi Chen, Beijing (CN); Chen Zhao, Beijing (CN); Jingtuo Liu, Beijing (CN); Errui Ding, Beijing (CN); Tian Wu, Beijing (CN); Haifeng Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 184 days.

(21) Appl. No.: 18/099,602

(22) Filed: Jan. 20, 2023

(65) Prior Publication Data

US 2023/0419592 A1 Dec. 28, 2023

(30) Foreign Application Priority Data

Jun. 28, 2022 (CN) .......................... 202210738050.4

(51) Int. Cl.
*G06T 15/00* (2011.01)
*G06T 15/04* (2011.01)
(Continued)

(52) U.S. Cl.
CPC .............. *G06T 15/20* (2013.01); *G06T 15/04* (2013.01); *G06T 15/40* (2013.01); *G06T 19/20* (2013.01);
(Continued)

(58) Field of Classification Search
CPC .... G06V 10/54; G06V 10/7715; G06V 10/82; G06V 40/168; G06V 10/774;
(Continued)

(56) References Cited

U.S. PATENT DOCUMENTS 10,636,175 B2 * 4/2020 Caballero ............... G06T 11/00
10,650,227 B2 * 5/2020 Cole ....................... G06T 15/02
(Continued)

FOREIGN PATENT DOCUMENTS

CN 108399649 A 8/2018
CN 109255830 A 1/2019
(Continued)

OTHER PUBLICATIONS

Shiri F, Yu X, Porikli F, Hartley R, Koniusz P. Identity-preserving face recovery from stylized portraits. International Journal of Computer Vision. Jun. 1, 2019;127:863-83.*
(Continued)

*Primary Examiner* — Phu K Nguyen
(74) *Attorney, Agent, or Firm* — Hunton LLP

(57) ABSTRACT

A method for training a three-dimensional face reconstruction model includes inputting an acquired sample face image into a three-dimensional face reconstruction model to obtain a coordinate transformation parameter and a face parameter of the sample face image; determining the three-dimensional stylized face image of the sample face image according to the face parameter of the sample face image and the acquired stylized face map of the sample face image; transforming the three-dimensional stylized face image of the sample face image into a camera coordinate system based on the coordinate transformation parameter, and rendering the transformed three-dimensional stylized face image to obtain a rendered map; and training the three-dimensional face
(Continued)

reconstruction model according to the rendered map and the stylized face map of the sample face image.

16 Claims, 11 Drawing Sheets

(51) Int. Cl.
   *G06T 15/20* (2011.01)
   *G06T 15/40* (2011.01)
   *G06T 19/20* (2011.01)
   *G06V 10/774* (2022.01)
   *G06V 10/82* (2022.01)
   *G06V 40/16* (2022.01)

(52) U.S. Cl.
   CPC ............ *G06V 10/774* (2022.01); *G06V 10/82* (2022.01); *G06V 40/168* (2022.01); *G06T 2219/2004* (2013.01); *G06T 2219/2012* (2013.01); *G06T 2219/2016* (2013.01)

(58) Field of Classification Search
   CPC .......... G06V 10/776; G06T 2219/2012; G06T 2219/2004; G06T 2219/2016; G06T 15/20; G06T 19/20; G06T 15/40; G06T 15/04; G06T 17/00
   USPC ........................................................ 345/418
   See application file for complete search history.

(56) References Cited

U.S. PATENT DOCUMENTS

| | | | |
|---|---|---|---|
| 10,991,154 B1 | 4/2021 | Li et al. | |
| 11,443,460 B2 * | 9/2022 | Caballero | ............... G06T 11/00 |
| 11,682,098 B2 * | 6/2023 | Yip | ............... G06T 7/11 |
| | | | 382/133 |
| 11,854,203 B1 * | 12/2023 | Gafni | ............... G06T 7/70 |
| 12,014,829 B2 * | 6/2024 | Kramer | ............... G16H 50/20 |
| 2019/0035149 A1 | 1/2019 | Chen et al. | |
| 2022/0383580 A1 * | 12/2022 | Rohmetra | ............... G06V 10/82 |
| 2023/0377324 A1 * | 11/2023 | Kim | ............... G06V 10/82 |
| 2024/0135627 A1 * | 4/2024 | Song | ............... G06T 15/02 |
| 2024/0242408 A1 * | 7/2024 | Gudkov | ............... G06V 10/761 |

FOREIGN PATENT DOCUMENTS

| | | |
|---|---|---|
| CN | 111951372 A | 11/2020 |
| CN | 113506367 A | 10/2021 |
| CN | 113870420 A | 12/2021 |

OTHER PUBLICATIONS

Men Y, Liu H, Yao Y, Cui M, Xie X, Lian Z. 3DToonify: Creating Your High-Fidelity 3D Stylized Avatar Easily from 2D Portrait Images. InProceedings of the IEEE/CVF Conference on Computer Vision and Pattern Recognition 2024 (pp. 10127-10137).*

Han F, Ye S, He M, Chai M, Liao J. Exemplar-based 3d portrait stylization. IEEE Transactions on Visualization and Computer Graphics. Sep. 24, 2021;29(2):1371-83.*

Notice of Reasons for Refusal dated Nov. 5, 2023 issued in Japanese patent application No. 2023-029589.

* cited by examiner

METHOD AND APPARATUS FOR TRAINING A THREE-DIMENSIONAL FACE RECONSTRUCTION MODEL AND METHOD AND APPARATUS FOR GENERATING A THREE-DIMENSIONAL FACE IMAGE

CROSS-REFERENCE TO RELATED APPLICATION

This application claims priority to Chinese Patent Application No. CN202210738050.4, filed on Jun. 28, 2022, the disclosure of which is incorporated herein by reference in its entirety.

TECHNICAL FIELD

The present disclosure relates to the technical field of artificial intelligence and, in particular, to the technical fields of augmented reality, virtual reality, computer vision, and deep learning, and may be applied to a scenario such as a metaverse. For example, the present disclosure relates to a method and apparatus for training a three-dimensional face reconstruction model and a method and apparatus for generating a three-dimensional face image.

BACKGROUND

With the continuous development of artificial intelligence technology, three-dimensional face reconstruction technology is gradually emerging. Compared with two-dimensional face images, three-dimensional face images carry richer personalized features, and have important research significance and application prospects. To meet the diverse needs of people, cross-style three-dimensional face reconstruction is proposed. In cross-style scenarios, how to accurately implement three-dimensional face reconstruction at a low cost is critical.

SUMMARY

The present disclosure provides a method and apparatus for training a three-dimensional face reconstruction model and a method and apparatus for generating a three-dimensional face image.

According to one aspect of the present disclosure, a method for training a three-dimensional face reconstruction model is provided. The method includes acquiring a sample face image and the stylized face map of the sample face image; inputting the sample face image into a three-dimensional face reconstruction model to obtain a coordinate transformation parameter and a face parameter of the sample face image; determining the three-dimensional stylized face image of the sample face image according to the face parameter of the sample face image and the stylized face map of the sample face image; transforming the three-dimensional stylized face image of the sample face image into a camera coordinate system based on the coordinate transformation parameter, and rendering the transformed three-dimensional stylized face image to obtain a rendered map; and training the three-dimensional face reconstruction model according to the rendered map and the stylized face map of the sample face image.

According to another aspect of the present disclosure, a method for generating a three-dimensional face image is provided. The method includes acquiring a target face image and the stylized face map of the target face image; inputting the target face image into a three-dimensional face reconstruction model to obtain a face parameter of the target face image, where the three-dimensional face reconstruction model is obtained based on the training of the method for training a three-dimensional face reconstruction model in any embodiment of the present disclosure; and determining the three-dimensional stylized face image of the target face image according to the face parameter of the target face image and the stylized face map of the target face image.

According to another aspect of the present disclosure, an electronic device is provided. The electronic device includes at least one processor and a memory communicatively connected to the at least one processor.

The memory stores an instruction executable by the at least one processor. The instruction is executed by the at least one processor to cause the at least one processor to execute the method for training a three-dimensional face reconstruction model or the method for generating a three-dimensional face image in any embodiment of the present disclosure.

According to another aspect of the present disclosure, a non-transitory computer-readable storage medium storing a computer instruction is provided. The computer instruction is configured to cause a computer to execute the method for training a three-dimensional face reconstruction model or the method for generating a three-dimensional face image in any embodiment of the present disclosure.

According to the technology in the present disclosure, a three-dimensional stylized face image can be constructed accurately.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

It is to be noted that in the technical solution of the present disclosure, the collection, storage, use, processing, transmission, provision, and disclosure of sample face images, target face images, and stylized face maps involved are in compliance with provisions of relevant laws and regulations, and do not violate public order and good customs.

Figure 1:
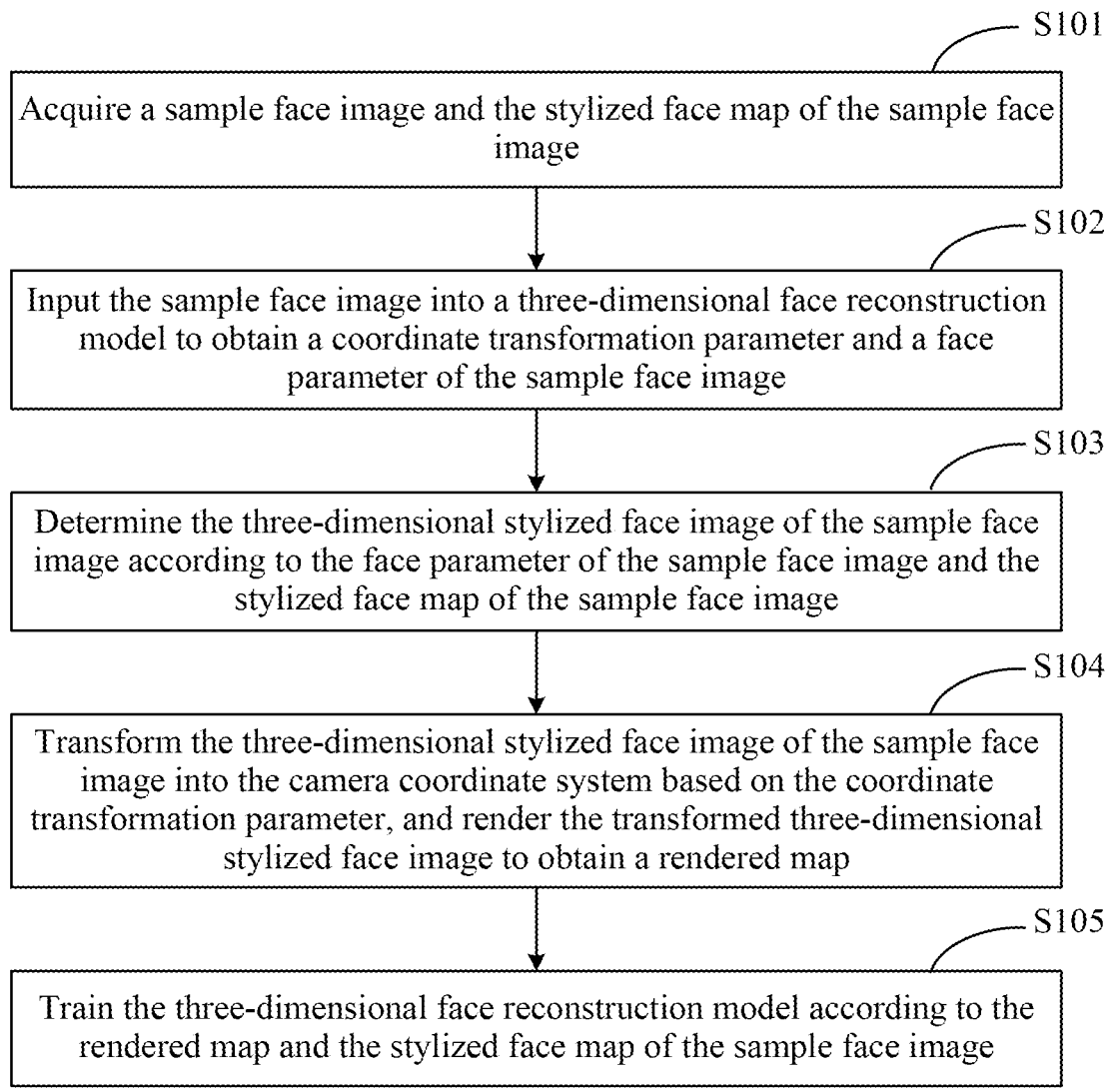
FIG. 1 is a flowchart of a method for training a three-dimensional face reconstruction model according to an embodiment of the present disclosure.

FIG. 1 is a flowchart of a method for training a three-dimensional face reconstruction model according to an embodiment of the present disclosure. This embodiment is applicable to the case of how to train a three-dimensional face reconstruction model. The method may be executed by an apparatus for training a three-dimensional face reconstruction model. The apparatus may be implemented in software and/or hardware and may be integrated in an electronic device, such as a server, carrying a function for training a three-dimensional face reconstruction model. As shown in FIG. 1, the method for training a three-dimensional face reconstruction model in this embodiment may include steps below.

In S101, a sample face image and the stylized face map of the sample face image are acquired.

In this embodiment, the sample face image refers to an image containing a face. The stylized face map refers to a cross-style face image corresponding to the sample face image, such as a face map in an animation style.

For example, a sample face image may be acquired from the Internet or the like. Cross-stylistic processing is performed on the sample face image to obtain the stylized face map of the sample face image. Optionally, cross-stylistic processing may be performed on the sample face image based on a cross-stylistic generation model.

In S102, the sample face image is input into a three-dimensional face reconstruction model to obtain a coordinate transformation parameter and a face parameter of the sample face image.

In this embodiment, the three-dimensional face reconstruction model is a model for executing tasks such as regression and reconstruction of parameters required for a three-dimensional face image. Optionally, the three-dimensional face reconstruction model in this embodiment may be a residual network (ResNet).

The coordinate transformation parameter refers to transformation parameters for transforming the three-dimensional face image into a camera coordinate system and may include a translation transformation parameter and a scaling transformation parameter. In an embodiment, rotation transformation parameters may be included. The face parameter of the sample face image is a geometric parameter of the three-dimensional face image and may include a face shape parameter. In an embodiment, the face parameter of the sample face image may include a facial expression parameter.

Optionally, the sample face image may be input into the three-dimensional face reconstruction model. The coordinate transformation parameter and the face parameter of the sample face image are obtained through model processing.

In S103, the three-dimensional stylized face image of the sample face image is determined according to the face parameter of the sample face image and the stylized face map of the sample face image.

In this embodiment, the three-dimensional stylized face image refers to a cross-style three-dimensional virtual face image.

Optionally, based on the generation logic of the three-dimensional stylized face image, the three-dimensional stylized face image of the sample face image is generated according to the face parameter of the sample face image and the stylized face map of the sample face image. For example, the face parameter of the sample face image and the stylized face map of the sample face image may be input into a pre-trained three-dimensional stylized model, and the three-dimensional stylized model outputs the three-dimensional stylized face image of the sample face image.

In S104, the three-dimensional stylized face image of the sample face image is transformed into the camera coordinate system based on the coordinate transformation parameter, and the transformed three-dimensional stylized face image is rendered to obtain a rendered map.

In this embodiment, the camera coordinate system is a coordinate system in which a differentiable renderer is located, and is different from a coordinate system in which the three-dimensional stylized face image is located. The rendered map refers to a two-dimensional image projected by the three-dimensional stylized face image in the camera coordinate system.

Optionally, the three-dimensional stylized face image of the sample face image may be transformed into the camera coordinate system based on the translation transformation parameter, the scaling transformation parameter, and the rotation transformation parameters. Parameters in the differentiable renderer are adjusted by using a pre-configured field of view of a camera. The transformed three-dimensional stylized face image is input into the differentiable renderer. The transformed three-dimensional stylized face image is rendered to obtain the rendered map.

In S105, the three-dimensional face reconstruction model is trained according to the rendered map and the stylized face map of the sample face image.

Optionally, based on a preset loss function, training loss may be determined according to the rendered map and the stylized face map of the sample face image. Then, the three-dimensional face reconstruction model is trained according to the training loss so that network parameters in the three-dimensional face reconstruction model are continuously optimized. In this embodiment, multiple iterative trainings may be performed on the three-dimensional face reconstruction model based on the preceding method, and the adjustment of the network parameters of the three-dimensional face reconstruction model may be stopped until a preset training stop condition is reached to obtain a trained three-dimensional face reconstruction model. The training stop condition may include: The number of times of training reaches a preset number, or the training loss converges.

According to the technical solution provided in this embodiment of the present disclosure, the acquired sample face image is input into the three-dimensional face reconstruction model to obtain the coordinate transformation parameter and the face parameter of the sample face image. The three-dimensional stylized face image of the sample face image is determined according to the face parameter of the sample face image and the acquired stylized face map of the sample face image. Then, the three-dimensional stylized face image of the sample face image is transformed into the camera coordinate system based on the coordinate transformation parameter. The transformed three-dimensional stylized face image is rendered to obtain the rendered map. In an embodiment, the three-dimensional face reconstruction model is trained according to the rendered map and the stylized face map of the sample face image. According to the preceding technical solution, in a cross-style three-dimensional face reconstruction scenario, face keypoint labeling is not required. The three-dimensional face reconstruction model can be trained through the sample face image and the stylized face map, reducing sample labeling costs. In an embodiment, in the cross-style scenario, based on the three-dimensional face reconstruction model trained in this solution, the data required for constructing a three-dimensional face can be accurately acquired. Thus, the three-dimensional stylized face image can be constructed accurately.

On the basis of the preceding embodiment, as an optional manner of the present disclosure, training the three-dimensional face reconstruction model according to the rendered map and the stylized face map of the sample face image may include extracting a stylized face region from the stylized face map of the sample face image; adjusting the background color of the stylized face region according to the background color of the rendered map; determining an image comparison loss according to the rendered map and the adjusted stylized face region; and training the three-dimensional face reconstruction model according to the image comparison loss.

In an embodiment, the stylized face map of the sample face image may be segmented based on an image segmentation algorithm to extract the stylized face region. Then, the background color of the stylized face region is adjusted to the background color of the rendered map. In an embodiment, based on the preset loss function, the image comparison loss may be determined according to the rendered map and the adjusted stylized face region. Alternatively, the similarity between the rendered map and the adjusted stylized face region is determined, and the similarity is taken as the image comparison loss. Finally, the three-dimensional face reconstruction model is trained according to the image comparison loss.

It is to be understood that background interference is eliminated by adjusting the background color of the stylized face region to be consistent with the background color of the rendered map. Thus, the determined image comparison loss is more accurate so that the training of the three-dimensional face reconstruction model can be more accurate and effective.

Figure 2A:
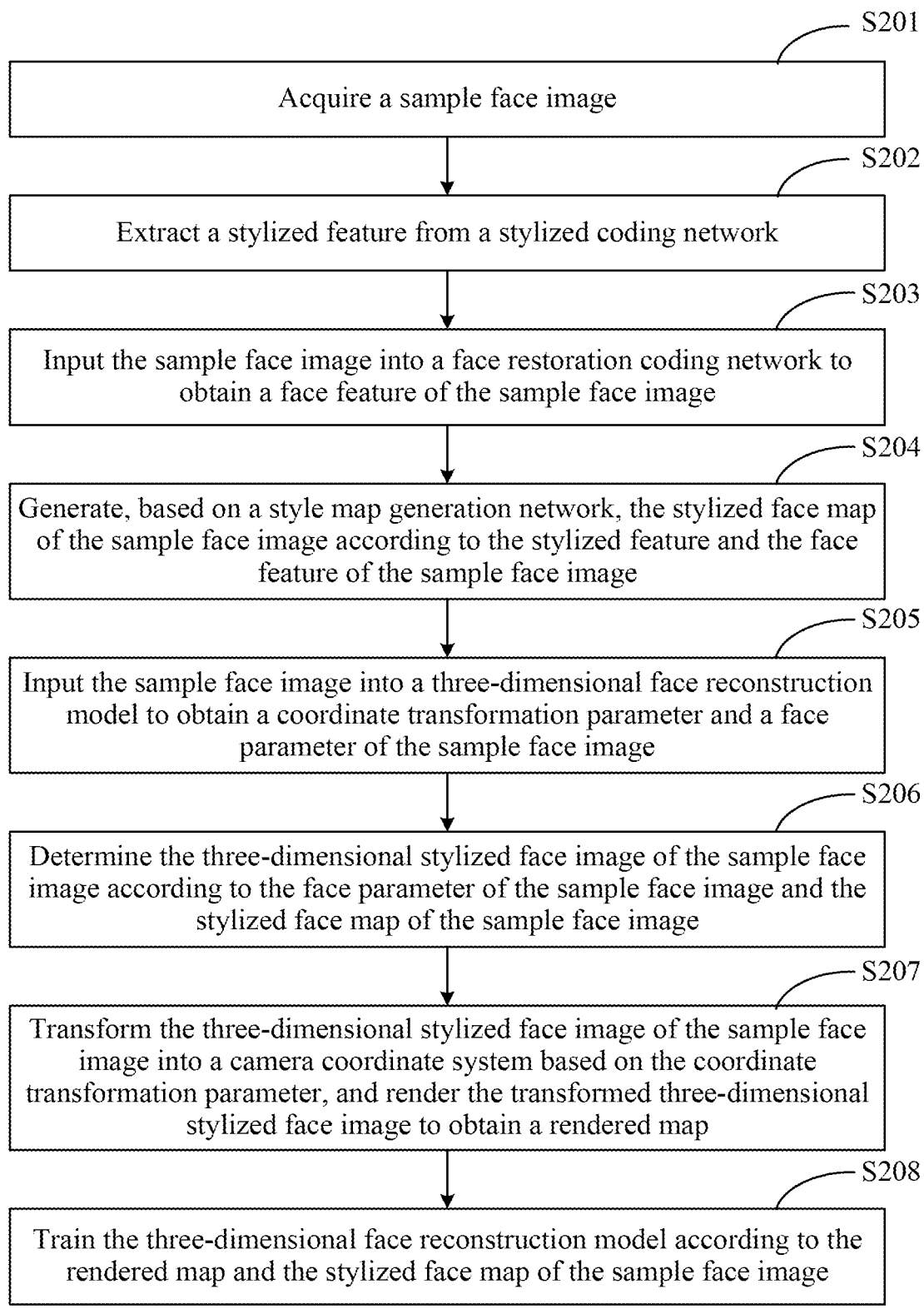
FIG. 2A is a flowchart of another method for training a three-dimensional face reconstruction model according to an embodiment of the present disclosure.
Figure 2B:
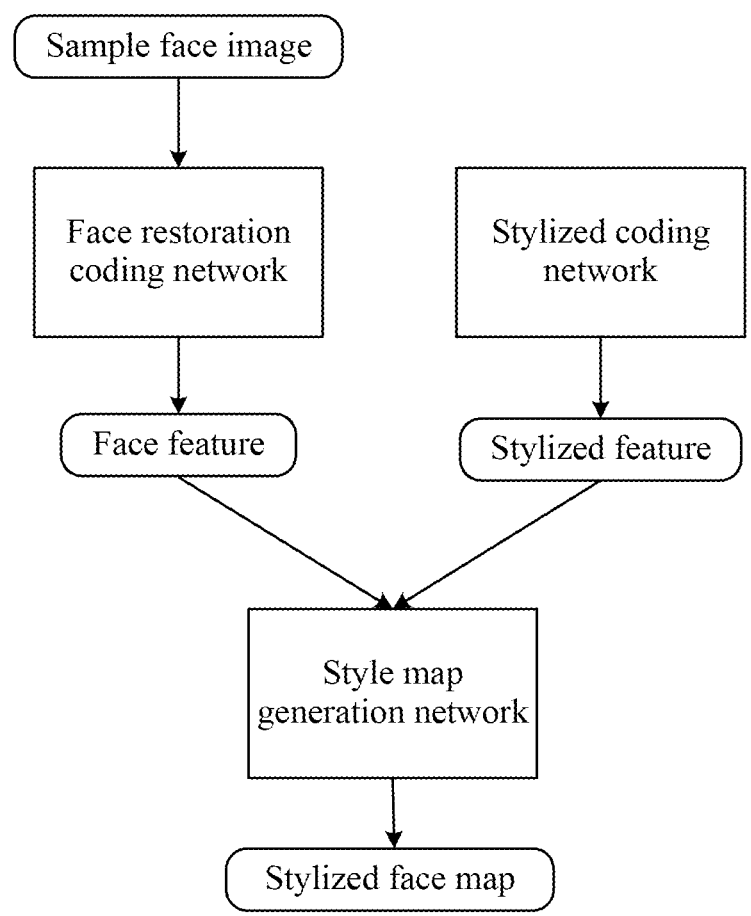
FIG. 2B is a diagram showing the process of acquiring a stylized face map according to an embodiment of the present disclosure.

FIG. 2A is a flowchart of another method for training a three-dimensional face reconstruction model according to an embodiment of the present disclosure. FIG. 2B is a diagram showing the process of acquiring a stylized face map according to an embodiment of the present disclosure. On the basis of the preceding embodiment, in this embodiment, acquiring the stylized face map of the sample face image is optimized, and an optional solution is provided. In conjunction with FIG. 2A and FIG. 2B, the method for training a three-dimensional face reconstruction model in this embodiment may include steps below.

In S201, a sample face image is acquired.

In S202, a stylized feature is extracted from a stylized coding network.

In this embodiment, the stylized coding network may be a coding network in a stylized model. Optionally, the stylized model is constructed by a stylized coding network and a stylized decoding network. At the stage of training the stylized model, a face image is input, and the stylized model outputs a stylized face map corresponding to the face image. In an embodiment, after the stylized model is trained, the stylized coding network may output a fixed stylized feature. The stylized feature refers to a feature that has a particular style.

In an embodiment, the stylized coding network and the stylized decoding network may be convolutional neural networks. For example, the stylized coding network in this embodiment may be a convolutional neural network including 18 convolution layers. Each convolution layer may output an 1*512 eigenvector. That is, the stylized feature extracted from the stylized coding network may be an 18*(1*512) eigenvector.

In S203, the sample face image is input into a face restoration coding network to obtain a face feature of the sample face image.

In this embodiment, the face restoration coding network may be a coding network in a face restoration model. Optionally, the face restoration model is composed of a face restoration coding network and a face restoration decoding network. A face image is input into the face restoration model. The face restoration model outputs a face image that is very similar to the input face image.

In an embodiment, the face restoration coding network refers to a coding network for extracting a face feature of a face image. The face feature is a feature inherent in a real face and may include, but is not limited to, a feature such as a face shape, facial features, a skin color, a nevi, and a scar.

In an embodiment, the face restoration coding network and the face restoration decoding network may be convolutional neural networks. For example, the face restoration coding network in this embodiment may be a convolutional neural network including 18 convolution layers. Each convolution layer may output an 1*512 eigenvector. That is, the face feature extracted from the face restoration coding network may be an 18*(1*512) eigenvector.

In an embodiment, the sample face image may be input into the restoration coding network and processed by the network to obtain the face feature of the sample face image.

In S204, based on a style map generation network, the stylized face map of the sample face image is generated according to the stylized feature and the face feature of the sample face image.

In this embodiment, the style map generation network refers to a decoding network that generates a stylized face map. Optionally, the initial input of the style map generation network may be a random value. The stylized feature and the face feature of the sample face image may be applied to each layer in the style map generation network. In an embodiment, the stylized feature and the face feature are located in the eigenvector which is output by a same layer, jointly applied to the corresponding layer in the style map generation network. For example, the stylized feature and the face feature are located in the eigenvector which is output by the third layer, jointly applied to the third layer in the style map generation network.

In an embodiment, the stylized degree of the stylized face map can be controlled by adjusting the weights of the stylized feature and the face feature at each layer in the stylized map generation network.

Exemplarily, the style map generation network in this embodiment may be a convolutional neural network including 18 convolution layers. Layers 1 to 7 focus on the stylized feature, and layers 8 to 18 focus more on real-face information of the sample face image. That is, in layers 1 to 7, if the weight ratio of the stylized feature is higher than that of the face feature, the stylized face map finally obtained differs greatly from the input face image. In layers 8 to 18, if the weight ratio of the face feature is higher than that of the stylized feature, the stylized face map finally obtained is closer to the input face image.

For example, the stylized feature and the face feature of the sample face image may be input into the style map generation network and processed by the network to obtain the stylized face map of the sample face image.

In S205, the sample face image is input into a three-dimensional face reconstruction model to obtain a coordinate transformation parameter and a face parameter of the sample face image.

The face parameter of the sample face image includes at least a face shape parameter.

In S206, the three-dimensional stylized face image of the sample face image is determined according to the face parameter of the sample face image and the stylized face map of the sample face image.

In S207, the three-dimensional stylized face image of the sample face image is transformed into a camera coordinate system based on the coordinate transformation parameter. The transformed three-dimensional stylized face image is rendered to obtain a rendered map.

In S208, the three-dimensional face reconstruction model is trained according to the rendered map and the stylized face map of the sample face image.

According to the technical solution provided in this embodiment of the present disclosure, the stylized feature is extracted from the stylized coding network. At the same time, the acquired sample face image is input into the face restoration coding network to obtain the face feature of the sample face image. Based on the style map generation network, the stylized face map of the sample face image is generated according to the stylized feature and the face feature of the sample face image. Then, the sample face image is input into the three-dimensional face reconstruction model to obtain the coordinate transformation parameter and the face parameter of the sample face image. The three-dimensional stylized face image of the sample face image is determined according to the face parameter of the sample face image and the stylized face map of the sample face image. In an embodiment, the three-dimensional stylized face image of the sample face image is transformed into the camera coordinate system based on the coordinate transformation parameter. The transformed three-dimensional stylized face image is rendered to obtain the rendered map. Finally, the three-dimensional face reconstruction model is trained according to the rendered map and the stylized face map of the sample face image. According to the preceding technical solution, the stylized face map of the sample face image is determined through the style map generation network so that the stylized degree of the stylized face map of the sample face image can be controlled.

Exemplarily, on the basis of the preceding embodiments, an optional manner of obtaining the three-dimensional stylized face image of the sample face image according to the face parameter of the sample face image and the stylized face map of the sample face image is to construct the three-dimensional face image of the sample face image based on the face parameter of the sample face image and process the three-dimensional face image of the sample face image according to the stylized face map of the sample face image to obtain the three-dimensional stylized face image of the sample face image.

In this embodiment, the three-dimensional face image refers to a three-dimensional virtual face image.

An optional manner of constructing the three-dimensional face image of the sample face image based on the face parameter of the sample face image is to perform linear sum on the face shape parameter in the face parameter of the sample face image with a predefined base of a shape (that is, a three-dimensional eigenvector) to obtain the three-dimensional face image of the sample face image.

Another optional manner of constructing the three-dimensional face image of the sample face image based on the face parameter of the sample face image is to perform linear sum on the face shape parameter and the facial expression parameter in the face parameter of the sample face image with a predefined base of a shape and an expression to obtain the three-dimensional face image of the sample face image.

After the three-dimensional face image of the sample face image is obtained, the stylized face map of the sample face image can be displayed on the three-dimensional face image of the sample face image so that the three-dimensional stylized face image of the sample face image can be obtained.

It is to be understood that this solution provides an optional manner for constructing a three-dimensional stylized face image, providing data support for subsequent model training.

Figure 3:
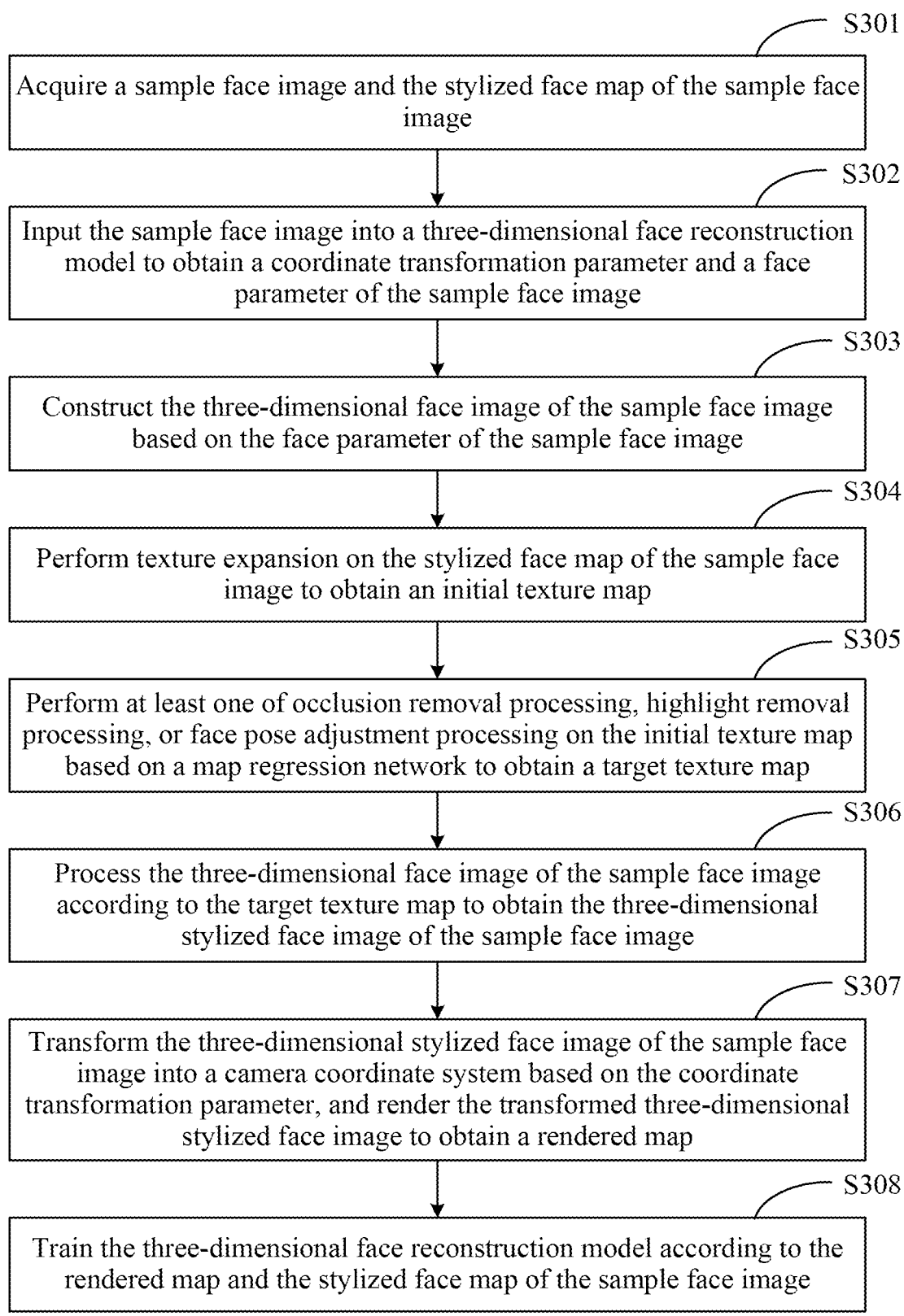
FIG. 3 is a flowchart of another method for training a three-dimensional face reconstruction model according to an embodiment of the present disclosure.

FIG. 3 is a flowchart of another method for training a three-dimensional face reconstruction model according to an embodiment of the present disclosure. On the basis of the preceding embodiments, in this embodiment, processing the three-dimensional face image of the sample face image according to the stylized face map of the sample face image to obtain the three-dimensional stylized face image of the sample face image is optimized, and an optional solution is provided. As shown in FIG. 3, the method for training a three-dimensional face reconstruction model in this embodiment may include steps below.

In S301, a sample face image and the stylized face map of the sample face image are acquired.

In S302, the sample face image is input into a three-dimensional face reconstruction model to obtain a coordinate transformation parameter and a face parameter of the sample face image.

The face parameter of the sample face image includes at least a face shape parameter.

In S303, the three-dimensional face image of the sample face image is constructed based on the face parameter of the sample face image.

In S304, texture expansion is performed on the stylized face map of the sample face image to obtain an initial texture map.

In this embodiment, the texture map refers to an image in a two-dimensional coordinate system and may be an image in texture coordinates (that is, UV coordinates). The initial texture map refers to the texture map that is initially obtained without processing.

For example, texture expansion may be performed on the stylized face map of the sample face image based on the set texture expansion logic to obtain the initial texture map.

In S305, at least one of occlusion removal processing, highlight removal processing, or face pose adjustment processing is performed on the initial texture map based on a map regression network to obtain a target texture map.

In this embodiment, the map regression network may be a pre-trained convolutional neural network for processing the initial texture map. The target texture map refers to a processed texture map.

For example, the initial texture map may be input into the map regression network. The initial texture map may be processed in a manner such as at least one of occlusion removal processing, highlight removal processing, or face pose adjustment processing to obtain the target texture map.

In S306, the three-dimensional face image of the sample face image is processed according to the target texture map to obtain the three-dimensional stylized face image of the sample face image.

For example, based on the mapping relationship between the three-dimensional face image and the texture coordinate map (this is, the UV map), color values (such as RGB color values) of pixels in the target texture map may be assigned to corresponding vertices on the three-dimensional face image of the sample face image to obtain the three-dimensional stylized face image of the sample face image. It is also to be understood that the target texture map is wrapped onto the three-dimensional face image of the sample face image to obtain the three-dimensional stylized face image of the sample face image.

In S307, the three-dimensional stylized face image of the sample face image is transformed into a camera coordinate system based on the coordinate transformation parameter. The transformed three-dimensional stylized face image is rendered to obtain a rendered map.

In S308, the three-dimensional face reconstruction model is trained according to the rendered map and the stylized face map of the sample face image.

According to the technical solution provided in this embodiment of the present disclosure, the acquired sample face image is input into the three-dimensional face reconstruction model to obtain the coordinate transformation parameter and the face parameter of the sample face image. The three-dimensional face image of the sample face image is constructed based on the face parameter of the sample face image. Then, texture expansion is performed on the stylized face map of the acquired sample face image to obtain the initial texture map. At least one of occlusion removal processing, highlight removal processing, or face pose adjustment processing is performed on the initial texture map based on the map regression network to obtain the target texture map. The three-dimensional face image of the sample face image is processed according to the target texture map to obtain the three-dimensional stylized face image of the sample face image. In an embodiment, the three-dimensional stylized face image of the sample face image is transformed into the camera coordinate system based on the coordinate transformation parameter. The transformed three-dimensional stylized face image is rendered to obtain the rendered map. Finally, the three-dimensional face reconstruction model is trained according to the rendered map and the stylized face map of the sample face image. According to the preceding technical solution, the initial texture map is processed by the map regression network so that interference caused by occlusion, highlight, or face pose deviation to the determination of the three-dimensional stylized face image is avoided. Thus, the determined three-dimensional stylized face image is more accurate.

On the basis of the preceding embodiments, as an optional manner of the present disclosure, training the three-dimensional face reconstruction model according to the rendered map and the stylized face map of the sample face image may also be jointly training the three-dimensional face reconstruction model and the map regression network according to the rendered map and the stylized face map of the sample face image.

For example, based on a set loss function, the training loss may be determined according to the rendered map and the stylized face map of the sample face image. Then, the three-dimensional face reconstruction model and the map regression network are jointly trained based on the training loss. The parameters of the three-dimensional face reconstruction model and the parameters of the map regression network are continuously optimized.

It is to be understood that the mapping regression network and the three-dimensional face reconstruction model are continuously optimized by jointly training the three-dimensional face reconstruction model and the map regression network. Thus, the accuracy of the three-dimensional face reconstruction model is higher.

Figure 4A:
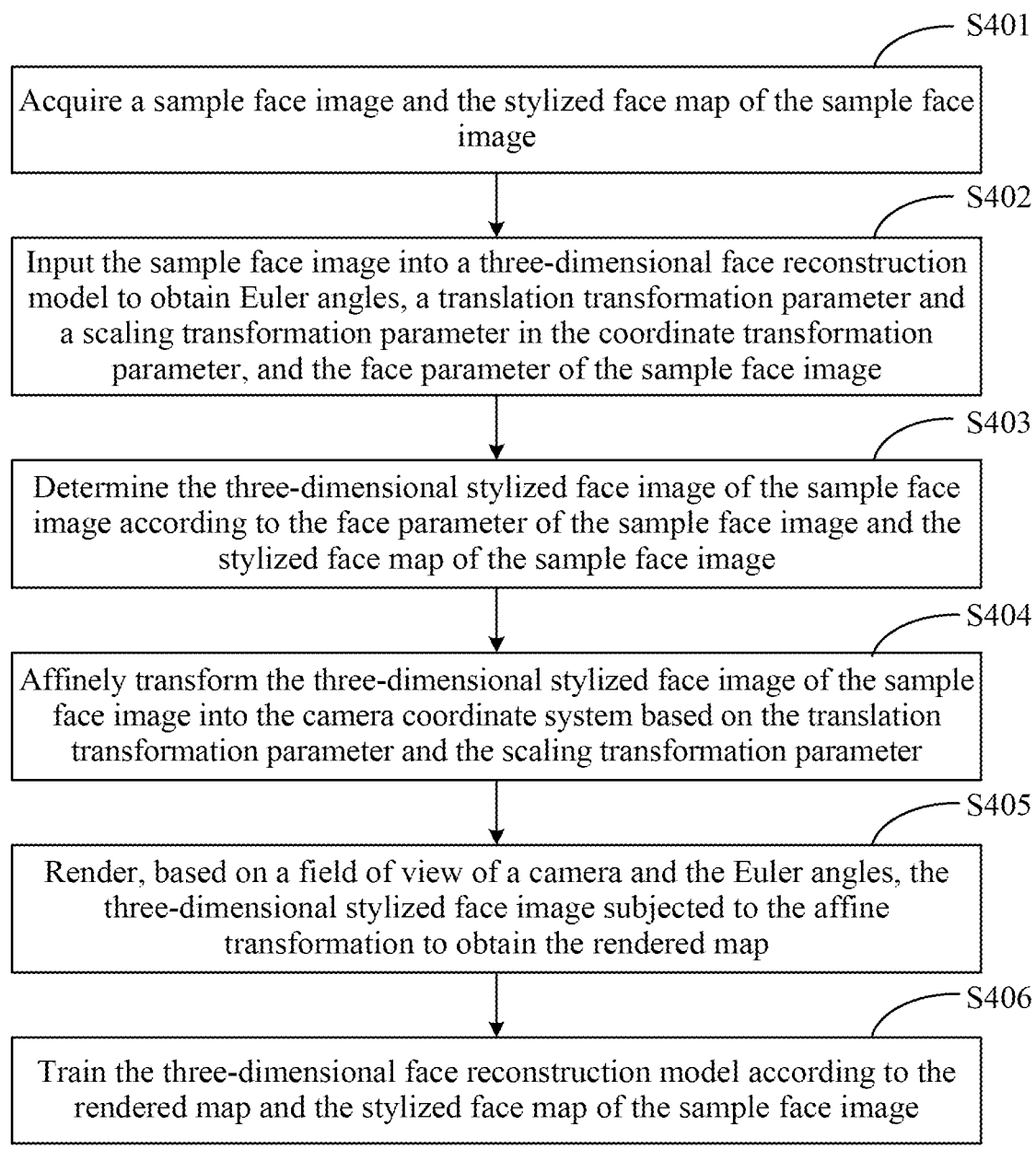
FIG. 4A is a flowchart of another method for training a three-dimensional face reconstruction model according to an embodiment of the present disclosure.
Figure 4B:
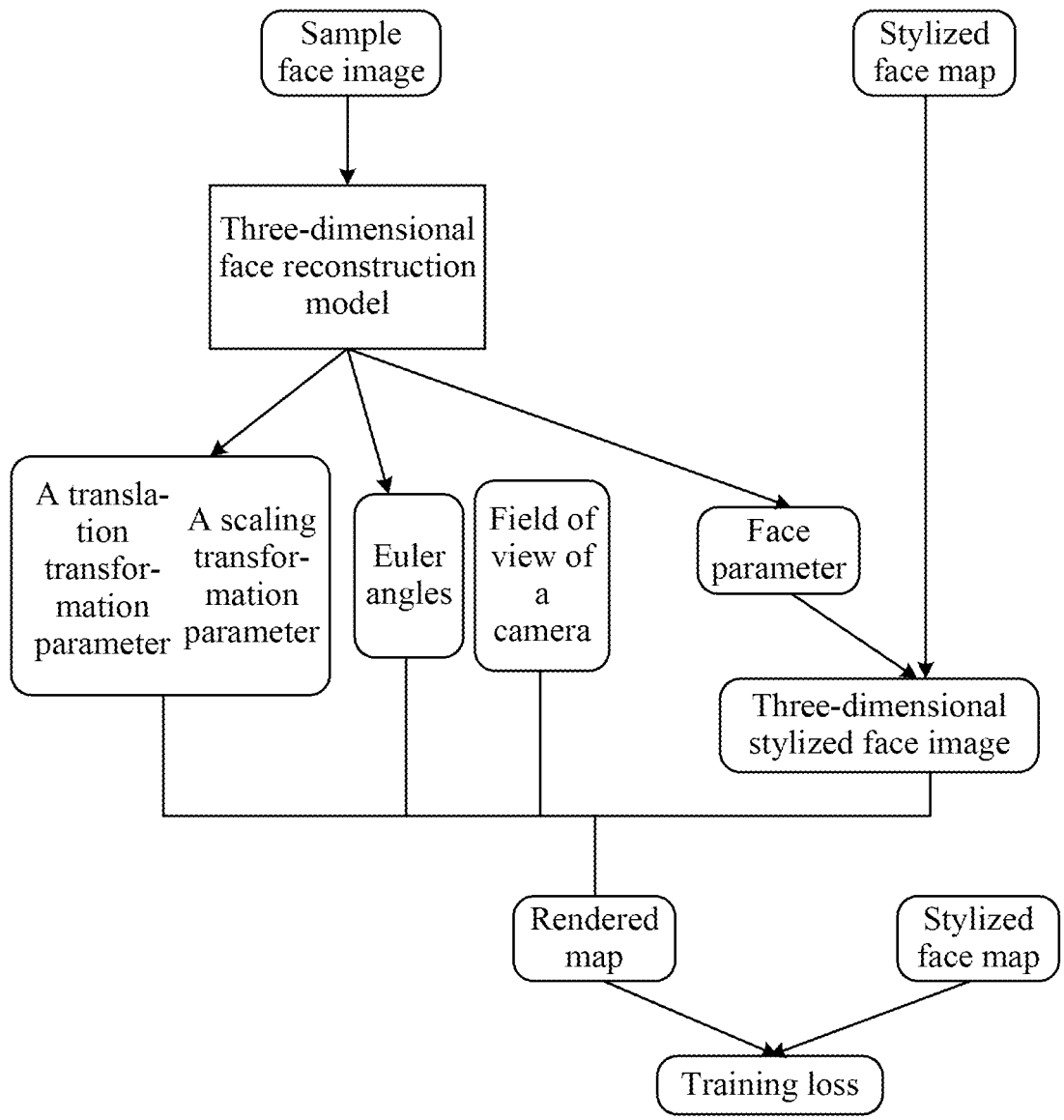
FIG. 4B is a diagram showing the process of training a three-dimensional face reconstruction model according to an embodiment of the present disclosure.

FIG. 4A is a flowchart of another method for training a three-dimensional face reconstruction model according to an embodiment of the present disclosure. FIG. 4B is a diagram showing the process of training a three-dimensional face reconstruction model according to an embodiment of the present disclosure. On the basis of the preceding embodiments, in this embodiment, inputting the sample face image into the three-dimensional face reconstruction model to obtain the coordinate transformation parameter and the face parameter of the sample face image, transforming the three-dimensional stylized face image of the sample face image into the camera coordinate system based on the coordinate transformation parameter, and rendering the transformed three-dimensional stylized face image to obtain the rendered map are optimized, and an optional solution is provided. In conjunction with FIG. 4A and FIG. 4B, the method for training a three-dimensional face reconstruction model in this embodiment may include steps below.

In S401, a sample face image and the stylized face map of the sample face image are acquired.

In S402, the sample face image is input into a three-dimensional face reconstruction model to obtain Euler angles, a translation transformation parameter in the coordinate transformation parameter, a scaling transformation parameter in the coordinate transformation parameter, and the face parameter of the sample face image.

In this embodiment, the Euler angles are the angles of head orientation.

For example, in the case where the coordinate transformation parameter does not include a rotation parameter, the sample face image may be input into the three-dimensional face reconstruction model. After model processing, the Euler angles, the translation transformation parameter in the coordinate transformation parameter, a scaling transformation parameter in the coordinate transformation parameter, and the face parameter of the sample face image are obtained.

In S403, the three-dimensional stylized face image of the sample face image is determined according to the face parameter of the sample face image and the stylized face map of the sample face image.

In S404, the three-dimensional stylized face image of the sample face image is affinely transformed into the camera coordinate system based on the translation transformation parameter and the scaling transformation parameter.

For example, the three-dimensional stylized face image of the sample face image may be affinely transformed into the camera coordinate system based on the translation transformation parameter and the scaling transformation parameter.

In S405, based on a field of view of a camera and the Euler angles, the three-dimensional stylized face image subjected to the affine transformation is rendered to obtain the rendered map.

For example, parameters in a differentiable renderer may be adjusted by using the field of view of the camera and the Euler angles. Then, the three-dimensional stylized face image subjected to the affine transformation is input into the differentiable renderer for rendering to obtain the rendered map.

In S406, the three-dimensional face reconstruction model is trained according to the rendered map and the stylized face map of the sample face image.

For example, based on a preset loss function, training loss may be determined according to the rendered map and the stylized face map of the sample face image. Then, the three-dimensional face reconstruction model is trained according to the training loss so that network parameters in the three-dimensional face reconstruction model are continuously optimized.

According to the technical solution provided in this embodiment of the present disclosure, the acquired sample face image is input into the three-dimensional face reconstruction model to obtain the Euler angles, the translation transformation parameter in the coordinate transformation parameter, a scaling transformation parameter in the coordinate transformation parameter, and the face parameter of the sample face image. The three-dimensional stylized face image of the sample face image is determined based on the face parameter of the sample face image and the acquired stylized face map of the sample face image. In an embodiment, the three-dimensional stylized face image of the sample face image is affinely transformed into the camera coordinate system based on the translation transformation parameter and the scaling transformation parameter. The three-dimensional stylized face image subjected to the affine transformation is rendered based on the field of view of the camera and the Euler angles to obtain the rendered map. Finally, the three-dimensional face reconstruction model is trained according to the rendered image and the stylized face map of the sample face image. According to the preceding technical solution, in the case where camera transformation parameters do not include the rotation parameter, the Euler angles can be obtained through the three-dimensional face reconstruction model. Thus, the rendered map can be determined more accurately.

Figure 5:
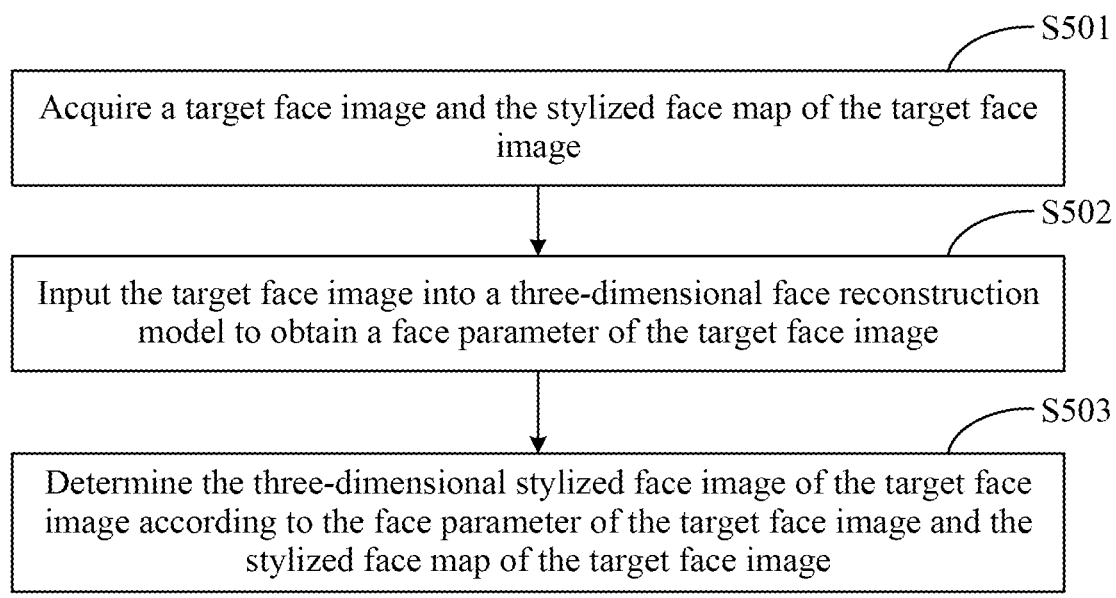
FIG. 5 is a flowchart of a method for generating a three-dimensional face image according to an embodiment of the present disclosure.

FIG. 5 is a flowchart of a method for generating a three-dimensional face image according to an embodiment of the present disclosure. This embodiment is applicable to the case of how to generate a three-dimensional face image. The method may be executed by an apparatus for generating a three-dimensional face image. The apparatus may be implemented in software and/or hardware and may be integrated in an electronic device, such as a server, carrying a function for generating a three-dimensional face image. As shown in FIG. 5, the method for generating a three-dimensional face image in this embodiment may include steps below.

In S501, a target face image and the stylized face map of the target face image are acquired.

In this embodiment, the target face image refers to a face image requiring to be performed three-dimensional stylization.

For example, the target face image may be acquired through a human-computer interaction interface, a specific application, or a mini app. Cross-stylistic processing is performed on the target face image to obtain the stylized face map of the target face image. Optionally, cross-stylistic processing may be performed on the target face image based on a cross-stylistic generation model.

In S502, the target face image is input into a three-dimensional face reconstruction model to obtain a face parameter of the target face image.

In this embodiment, the three-dimensional face reconstruction model is obtained based on the training of the method for training a three-dimensional face reconstruction model provided in any one of the preceding embodiments. The face parameter of the target face image is a geometric parameter required for reconstructing the three-dimensional face image of the face in the target face image and may include a face shape parameter. In an embodiment, the face parameter of the target face image also includes a facial expression parameter.

Optionally, the target face image may be input into the three-dimensional face reconstruction model. After model processing, the face parameter of the target face image is obtained.

In S503, the three-dimensional stylized face image of the target face image is determined according to the face parameter of the target face image and the stylized face map of the target face image.

In this embodiment, the three-dimensional stylized face image refers to a cross-style three-dimensional virtual face image.

Optionally, based on the generation logic of the three-dimensional stylized face image, the three-dimensional stylized face image of the target face image is generated according to the face parameter of the target face image and the stylized face map of the target face image. For example, the face parameter of the target face image and the stylized face map of the target face image may be input into a pre-trained three-dimensional stylized model. The three-dimensional stylized face image of the target face image is output from the three-dimensional stylized model.

According to the technical solution provided in this embodiment of the present disclosure, the acquired target face image is input into the three-dimensional face reconstruction model to obtain the face parameter of the target face image. Then, the three-dimensional stylized face image of the target face image is determined according to the face parameter of the target face image and the acquired stylized face map of the target face image. According to the preceding technical solution, in a cross-style scenario, the three-dimensional stylized face image can be constructed accurately by the three-dimensional face reconstruction model.

Figure 6:
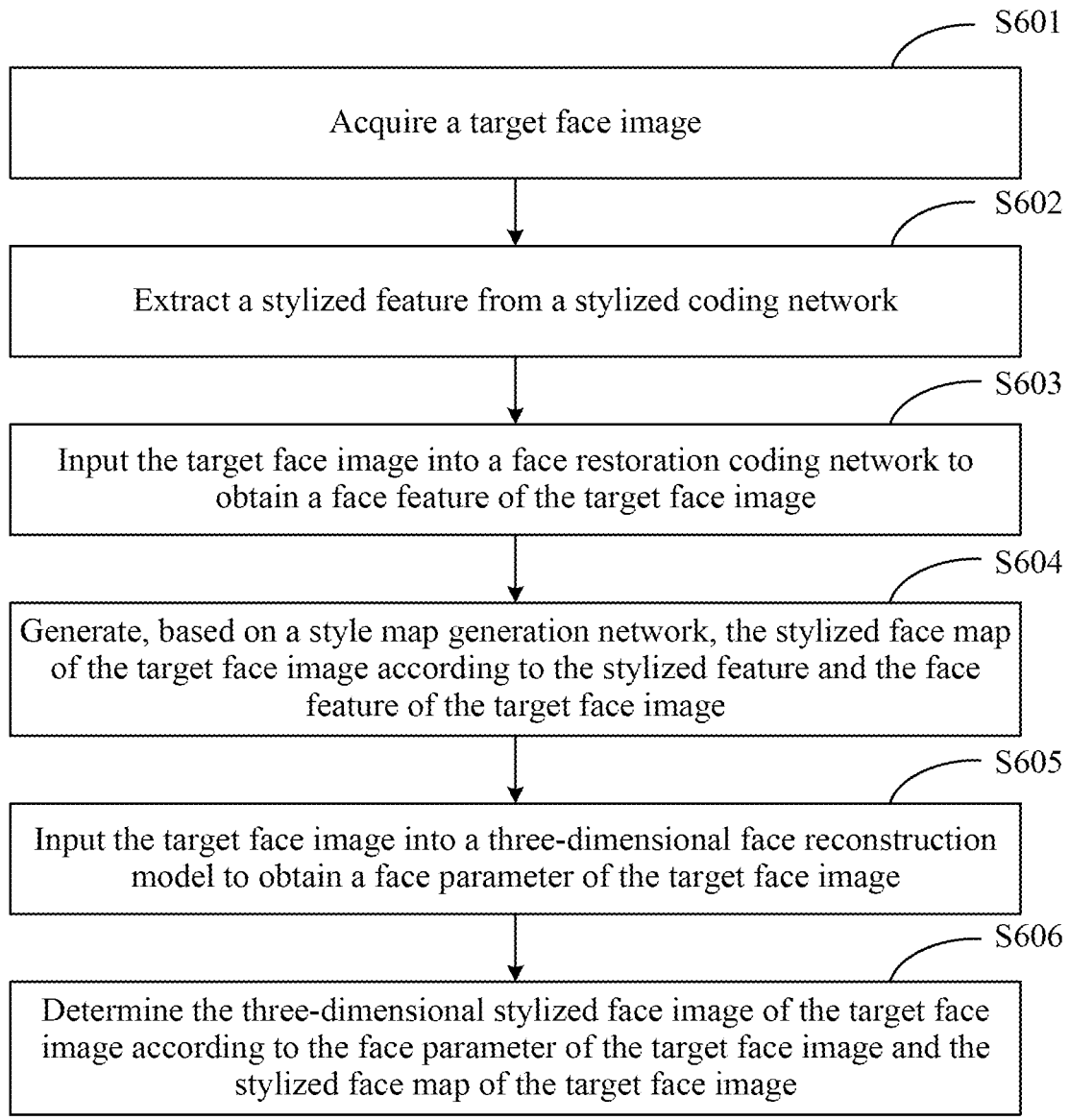
FIG. 6 is a flowchart of another method for generating a three-dimensional face image according to an embodiment of the present disclosure.

FIG. 6 is a flowchart of another method for generating a three-dimensional face image according to an embodiment of the present disclosure. On the basis of the preceding embodiments, in this embodiment, acquiring the stylized face map of the target face image is optimized, and an optional solution is provided. As shown in FIG. 6, the method for generating a three-dimensional face image in this embodiment may include steps below.

In S601, a target face image is acquired.

In S602, a stylized feature is extracted from a stylized coding network.

In this embodiment, the stylized coding network may be a coding network in a stylized model. Optionally, the stylized model is constructed by a stylized coding network and a stylized decoding network. At the stage of training the stylized model, a face image is input. The stylized model outputs a stylized face map corresponding to the face image. In an embodiment, after the stylized model is trained, the stylized coding network may output a fixed stylized feature. The stylized feature refers to a feature that has a particular style.

In an embodiment, the stylized coding network and the stylized decoding network may be convolutional neural networks. For example, the stylized coding network in this embodiment may be a convolutional neural network including 18 convolution layers. Each convolution layer may output an 1*512 eigenvector. That is, the stylized feature extracted from the stylized coding network may be an 18*(1*512) eigenvector.

In S603, the target face image is input into a face restoration coding network to obtain a face feature of the target face image.

In this embodiment, the face restoration coding network may be a coding network in a face restoration model. Optionally, the face restoration model is composed of a face restoration coding network and a face restoration decoding network. A face image is input into the face restoration model. The face restoration model outputs a face image that is very similar to the input face image.

In an embodiment, the face restoration coding network refers to a coding network for extracting a face feature of a face image. The face feature is a feature inherent in a real face and may include, but is not limited to, a feature such as a face shape, facial features, a skin color, a nevi, and a scar.

In an embodiment, the face restoration coding network and the face restoration decoding network may be convolutional neural networks. For example, the face restoration coding network in this embodiment may be a convolutional neural network including 18 convolution layers. Each convolution layer may output an 1*512 eigenvector. That is, the face feature extracted from the face restoration coding network may be an 18*(1*512) eigenvector.

For example, the target face image may be input into the restoration coding network and processed by the network to obtain the face feature of the target face image.

In S604, based on a style map generation network, the stylized face map of the target face image is generated according to the stylized feature and the face feature of the target face image.

In this embodiment, the style map generation network refers to a decoding network that generates a stylized face map. Optionally, the initial input of the style map generation network may be a random value. The stylized feature and the face feature of the target face image may be applied to each layer in the style map generation network. In an embodiment, the stylized feature and the face feature are located in the eigenvector which is output by the same layer, jointly applied to the corresponding layer in the style map generation network. For example, the stylized feature and the face feature are located in the eigenvector which is output by at the third layer, jointly applied to the third layer in the style map generation network.

In an embodiment, the stylized degree of the stylized face map can be controlled by adjusting the weights of the stylized feature and the face feature at each layer in the stylized map generation network.

Exemplarily, the style map generation network may be a convolutional neural network including 18 convolution layers. Layers 1 to 7 focus on the stylized feature, and layers 8 to 18 focus more on real-face information of the target face image. That is, if the weight ratio of the stylized feature is higher than that of the face feature in layers 1 to 7, the stylized face map finally obtained differs greatly from the input face image. If the weight ratio of the face feature is higher than that of the stylized feature in layers 8 to 18, the stylized face map finally obtained is closer to the input face image.

For example, the stylized feature and the face feature of the target face image may be input into the style map generation network and processed by the network to obtain the stylized face map of the target face image.

In S605, the target face image is input into a three-dimensional face reconstruction model to obtain a face parameter of the target face image.

In S606, the three-dimensional stylized face image of the target face image is determined according to the face parameter of the target face image and the stylized face map of the target face image.

According to the technical solution provided in this embodiment of the present disclosure, the stylized feature is extracted from the stylized coding network. The target face image is input into the face restoration coding network to obtain the face feature of the target face image. Based on the style map generation network, the stylized face map of the target face image is generated according to the stylized feature and the face feature of the target face image. Then, the target face image is input into the three-dimensional face reconstruction model to obtain the face parameter of the target face image. In an embodiment, the three-dimensional stylized face image of the target face image is determined according to the face parameter of the target face image and the stylized face map of the target face image. According to the preceding technical solution, the stylized face map of the target face image is determined through the style map generation network so that the stylized degree of the stylized face map of the target face image can be controlled.

Exemplarily, on the basis of the preceding embodiments, an optional manner of obtaining the three-dimensional stylized face image of the target face image according to the face parameter of the target face image and the stylized face map of the target face image is to construct the three-dimensional face image of the target face image based on the face parameter of the target face image and process three-dimensional face image of the target face image according to the stylized face map of the target face image to obtain the three-dimensional stylized face image of the target face image.

In this embodiment, the three-dimensional face image refers to a three-dimensional virtual face image.

An optional manner of constructing the three-dimensional face image of the target face image based on the face parameter of the target face image is to perform linear sum on the face shape parameter in the face parameter of the target face image with a predefined base of a shape (that is, a three-dimensional eigenvector) to obtain the three-dimensional face image of the target face image.

Another optional manner of constructing the three-dimensional face image of the target face image based on the face parameter of the target face image is to perform linear sum on the face shape parameter and the facial expression parameter in the face parameter of the target face image with a predefined base of a shape and an expression to obtain the three-dimensional face image of the target face image.

After the three-dimensional face image of the target face image is obtained, the stylized face map of the target face image can be displayed on the three-dimensional face image of the target face image so that the three-dimensional stylized face image of the target face image can be obtained.

It is to be understood that this solution provides an optional manner for constructing a three-dimensional stylized face image, providing data support for subsequent generation of the three-dimensional face image.

Figure 7:
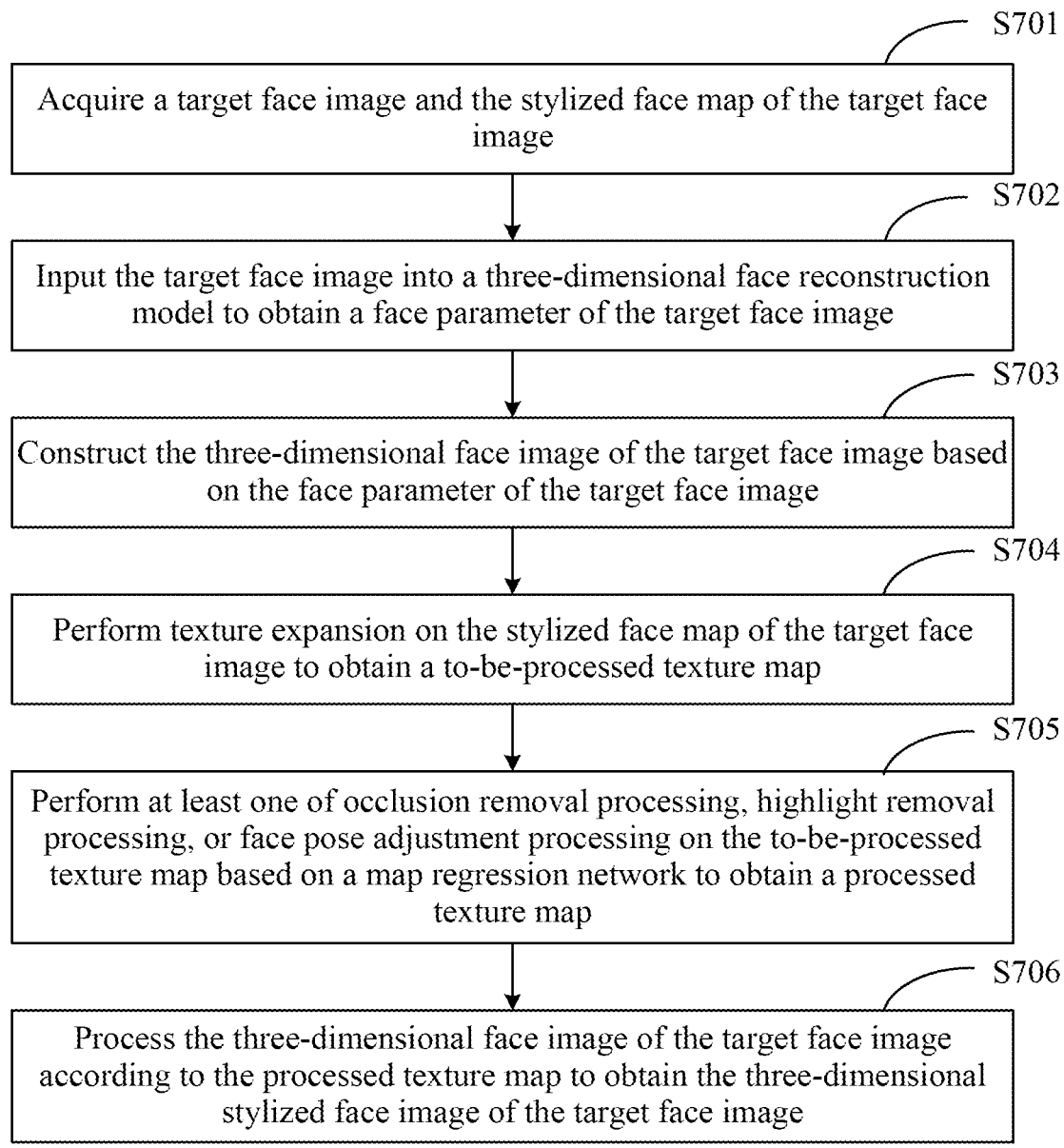
FIG. 7 is a flowchart of another method for generating a three-dimensional face image according to an embodiment of the present disclosure.

FIG. 7 is a flowchart of another method for generating a three-dimensional face image according to an embodiment of the present disclosure. On the basis of the preceding embodiments, in this embodiment, processing the three-dimensional face image of the target face image according to the stylized face map of the target face image to obtain the three-dimensional stylized face image of the target face image is optimized, and an optional solution is provided. As shown in FIG. 7, the method for generating a three-dimensional face image in this embodiment may include steps below.

In S701, a target face image and the stylized face map of the target face image are acquired.

In S702, the target face image is input into a three-dimensional face reconstruction model to obtain a face parameter of the target face image.

In S703, the three-dimensional face image of the target face image is constructed based on the face parameter of the target face image.

In S704, texture expansion is performed on the stylized face map of the target face image to obtain a to-be-processed texture map.

In this embodiment, the texture map refers to an image in a two-dimensional coordinate system and may be an image in texture coordinates (that is, UV coordinates).

For example, texture expansion may be performed on the stylized face map of the target face image based on the set texture expansion logic to obtain the to-be-processed texture map.

In S705, at least one of occlusion removal processing, highlight removal processing, or face pose adjustment processing is performed on the to-be-processed texture map based on a map regression network to obtain a processed texture map.

In this embodiment, the map regression network may be a pre-trained convolutional neural network for processing the to-be-processed texture map.

For example, the to-be-processed texture map is input into the map regression network. The to-be-processed texture map is processed by the network in a manner such as at least one of occlusion removal processing, highlight removal processing, or face pose adjustment processing to obtain the processed texture map.

In S706, the three-dimensional face image of the target face image is processed according to the processed texture map to obtain the three-dimensional stylized face image of the target face image.

For example, based on the mapping relationship between the three-dimensional face image and a UV map, RGB color values of pixels in the processed texture map are assigned to corresponding vertices on the three-dimensional face image of the target face image to obtain the three-dimensional stylized face image of the target face image. It is also to be understood that the processed texture map is wrapped onto the three-dimensional face image of the target face image to obtain the three-dimensional stylized face image of the target face image.

According to the technical solution provided in this embodiment of the present disclosure, the acquired target face image is input into the three-dimensional face reconstruction model to obtain the face parameter of the target face image. Then, texture expansion is performed on the stylized face map of the target face image to obtain the to-be-processed texture map. At least one of occlusion removal processing, highlight removal processing, or face pose adjustment processing is performed on the to-be-processed texture map based on the map regression network to obtain the processed texture map. In an embodiment, the three-dimensional face image of the target face image is processed according to the processed texture map to obtain the three-dimensional stylized face image of the target face image. According to the preceding technical solution, the texture map is introduced to obtain the three-dimensional stylized face image of the target face image so that the three-dimensional stylized face image can be more accurate. In an embodiment, the initial texture map is processed by the map regression network so that interference caused by occlusion, highlight, or face pose deviation to the determination of the three-dimensional stylized face image is avoided.

Figure 8:
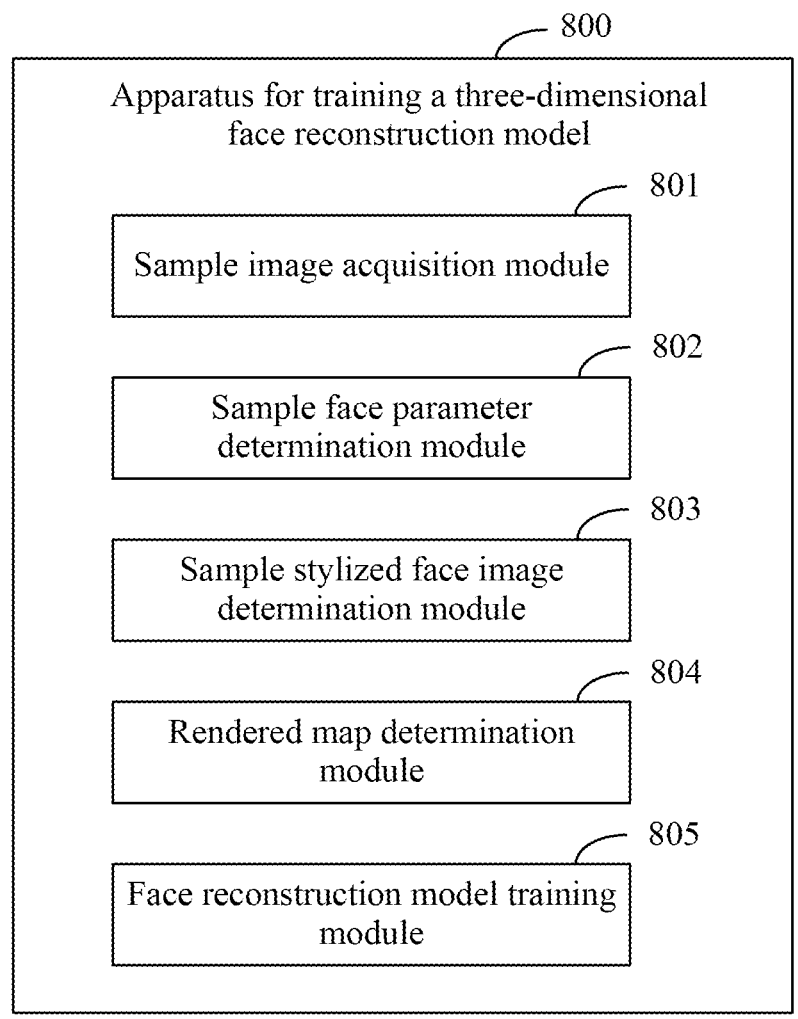
FIG. 8 is a diagram illustrating the structure of an apparatus for training a three-dimensional face reconstruction model according to an embodiment of the present disclosure.

FIG. 8 is a diagram illustrating the structure of an apparatus for training a three-dimensional face reconstruction model according to an embodiment of the present disclosure. This embodiment is applicable to the case of how to train a three-dimensional face reconstruction model. The apparatus may be implemented in software and/or hardware and may be integrated in an electronic device, such as a server, carrying a function for training a three-dimensional face reconstruction model. As shown in FIG. 8, an apparatus 800 for training a three-dimensional face reconstruction model in this embodiment may include a sample image acquisition module 801, a sample face parameter determination module 802, a sample stylized face image determination module 803, a rendered map determination module 804, and a face reconstruction model training module 805.

The sample image acquisition module 801 is configured to acquire a sample face image and the stylized face map of the sample face image.

The sample face parameter determination module 802 is configured to input the sample face image into a three-dimensional face reconstruction model to obtain a coordinate transformation parameter and a face parameter of the sample face image.

The sample stylized face image determination module 803 is configured to determine the three-dimensional stylized face image of the sample face image according to the face parameter of the sample face image and the stylized face map of the sample face image.

The rendered map determination module 804 is configured to transform the three-dimensional stylized face image of the sample face image into a camera coordinate system based on the coordinate transformation parameter, and render the transformed three-dimensional stylized face image to obtain a rendered map.

The face reconstruction model training module 805 is configured to train the three-dimensional face reconstruction model according to the rendered map and the stylized face map of the sample face image.

According to the technical solution provided in this embodiment of the present disclosure, the acquired sample face image is input into the three-dimensional face reconstruction model to obtain the coordinate transformation parameter and the face parameter of the sample face image. The three-dimensional stylized face image of the sample face image is determined according to the face parameter of the sample face image and the acquired stylized face map of the sample face image. Then, the three-dimensional stylized face image of the sample face image is transformed into the camera coordinate system based on the coordinate transformation parameter. The transformed three-dimensional stylized face image is rendered to obtain the rendered map. In an embodiment, the three-dimensional face reconstruction model is trained according to the rendered map and the stylized face map of the sample face image. According to the preceding technical solution, in a cross-style three-dimensional face reconstruction scenario, face keypoint labeling is not required. The three-dimensional face reconstruction model can be trained through the sample face image and the stylized face map, reducing sample labeling costs. In an embodiment, in the cross-style scenario, based on the three-dimensional face reconstruction model trained in this solution, the data required for constructing a three-dimensional face can be accurately acquired. Then, the three-dimensional stylized face image can be constructed accurately.

In an embodiment, the sample image acquisition module 801 is configured to extract a stylized feature from a stylized coding network; input the sample face image into a face restoration coding network to obtain a face feature of the sample face image; and generate, based on a style map generation network, the stylized face map of the sample face image according to the stylized feature and the face feature of the sample face image.

In an embodiment, the sample stylized face image determination module 803 includes a sample three-dimensional face image determination unit and a sample stylized face image determination unit.

The sample three-dimensional face image determination unit is configured to construct the three-dimensional face image of the sample face image based on the face parameter of the sample face image.

The sample stylized face image determination unit is configured to process the three-dimensional face image of the sample face image according to the stylized face map of the sample face image to obtain the three-dimensional stylized face image of the sample face image.

In an embodiment, the sample stylized face image determination unit is configured to perform texture expansion on the stylized face map of the sample face image to obtain an initial texture map; perform at least one of occlusion removal processing, highlight removal processing, or face pose adjustment processing on the initial texture map based on a map regression network to obtain a target texture map; and process the three-dimensional face image of the sample face image according to the target texture map to obtain the three-dimensional stylized face image of the sample face image.

In an embodiment, the face reconstruction model training module 805 is configured to jointly train the three-dimensional face reconstruction model and the map regression network according to the rendered map and the stylized face map of the sample face image.

In an embodiment, the face reconstruction model training module 805 is also configured to extract a stylized face region from the stylized face map of the sample face image; adjust the background color of the stylized face region according to the background color of the rendered map; determine an image comparison loss according to the rendered map and the adjusted stylized face region; and train the three-dimensional face reconstruction model according to the image comparison loss.

In an embodiment, the sample face parameter determination module 802 is configured to input the sample face image into the three-dimensional face reconstruction model to obtain Euler angles, a translation transformation parameter and a scaling transformation parameter in the coordinate transformation parameter, and the face parameter of the sample face image.

Correspondingly, the rendered map determination module 804 is configured to affinely transform the three-dimensional stylized face image of the sample face image into the camera coordinate system based on the translation transformation parameter and the scaling transformation parameter, and render, based on a field of view of a camera and the Euler angles, the three-dimensional stylized face image subjected to the affine transformation to obtain the rendered map.

For example, the face parameter of the sample face image includes a face shape parameter.

Figure 9:
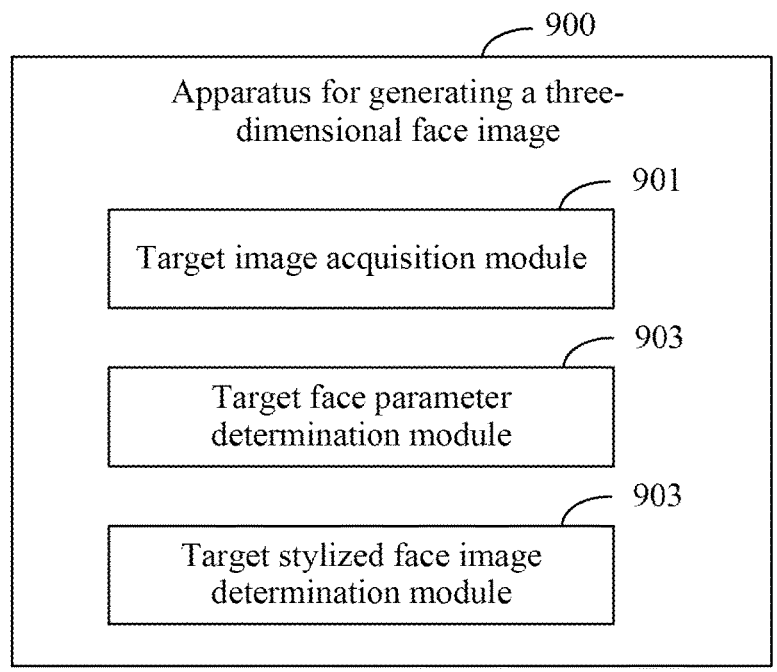
FIG. 9 is a diagram illustrating the structure of an apparatus for generating a three-dimensional face image according to an embodiment of the present disclosure.

FIG. 9 is a diagram illustrating the structure of an apparatus for generating a three-dimensional face image according to an embodiment of the present disclosure. This embodiment is applicable to the case of how to generate a three-dimensional face image. The apparatus may be implemented in software and/or hardware and may be integrated in an electronic device, such as a server, carrying a function for generating a three-dimensional face image. As shown in FIG. 9, an apparatus 900 for generating a three-dimensional face image in this embodiment may include a target image acquisition module 901, a target face parameter determination module 902, and a target stylized face image determination module 903.

The target image acquisition module 901 is configured to acquire a target face image and the stylized face map of the target face image.

The target face parameter determination module 902 is configured to input the target face image into a three-dimensional face reconstruction model to obtain face parameter of the target face image. The three-dimensional face reconstruction model is obtained based on the training of the method for training a three-dimensional face reconstruction model provided in any one of the preceding embodiments.

The target stylized face image determination module 903 is configured to determine the three-dimensional stylized face image of the target face image according to the face parameter of the target face image and the stylized face map of the target face image.

According to the technical solution provided in this embodiment of the present disclosure, the acquired target face image is input into the three-dimensional face reconstruction model to obtain the face parameter of the target face image. Then, the three-dimensional stylized face image of the target face image is determined according to the face parameter of the target face image and the acquired stylized face map of the target face image. According to the preceding technical solution, in a cross-style scenario, the three-dimensional stylized face image can be constructed accurately by the three-dimensional face reconstruction model.

In an embodiment, the target image acquisition module 901 is configured to extract a stylized feature from a stylized coding network; input the target face image into a face restoration coding network to obtain a face feature of the target face image; and generate, based on a style map generation network, the stylized face map of the target face image according to the stylized feature and the face feature of the target face image.

In an embodiment, the target stylized face image determination module 903 includes a target three-dimensional face image determination unit and a target stylized face image determination unit.

The target three-dimensional face image determination unit is configured to construct the three-dimensional face image of the sample face image based on the face parameter of the sample face image.

The target stylized face image determination unit is configured to process the three-dimensional face image of the sample face image according to the stylized face map of the sample face image to obtain the three-dimensional stylized face image of the sample face image.

In an embodiment, the target stylized face image determination unit is configured to perform texture expansion on the stylized face map of the target face image to obtain a to-be-processed texture map; perform at least one of occlusion removal processing, highlight removal processing, or face pose adjustment processing on the to-be-processed texture map based on a map regression network to obtain a processed texture map; and process the three-dimensional face image of the target face image according to the processed texture map to obtain the three-dimensional stylized face image of the target face image.

In an embodiment, the face parameter of the target face image includes a face shape parameter.

According to an embodiment of the present disclosure, the present disclosure also provides an electronic device, a readable storage medium, and a computer program product.

Figure 10:
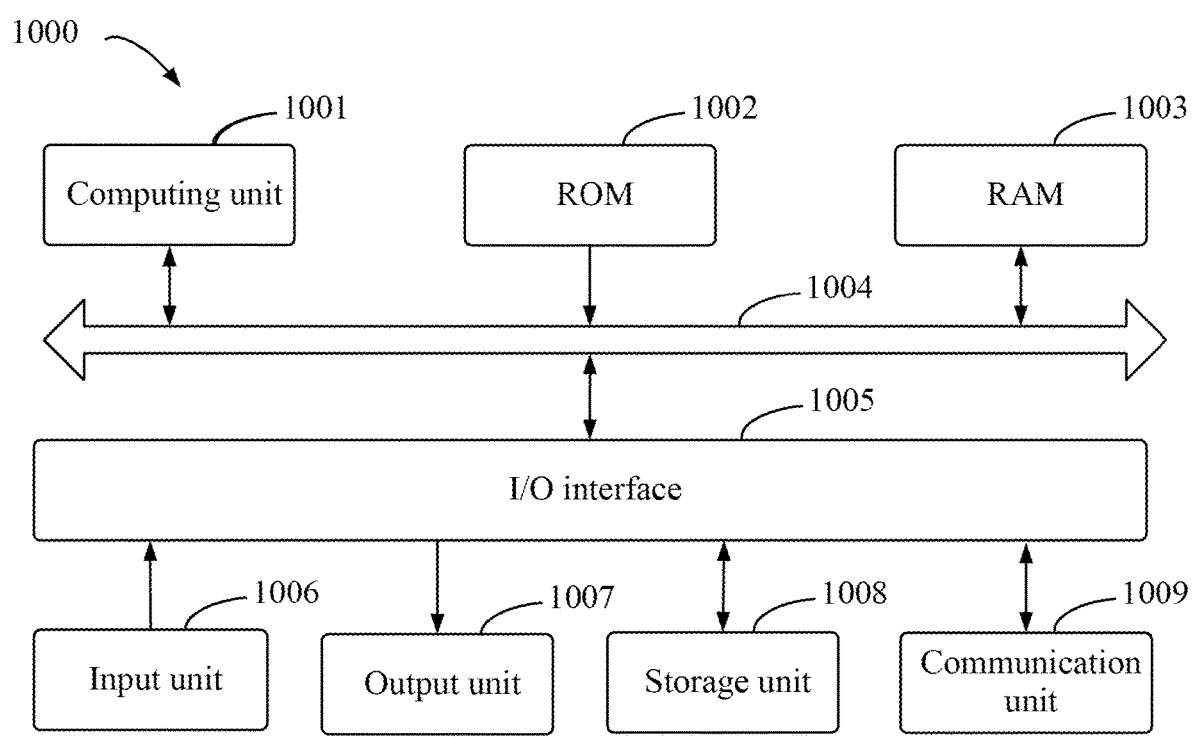
FIG. 10 is a block diagram of an electronic device configured to implement the method for training a three-dimensional face reconstruction model or the method for generating a three-dimensional face image according to the embodiments of the present disclosure.

FIG. 10 is a block diagram of an electronic device configured to implement the method for training a three-dimensional face reconstruction model or the method for generating a three-dimensional face image according to the embodiments of the present disclosure. FIG. 10 is a block diagram of an example electronic device 1000 that may be configured to implement the embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 10, the electronic device 1000 includes a computing unit 1001. The computing unit 1001 may perform various appropriate actions and processing according to a computer program stored in a read-only memory (ROM) 1002 or a computer program loaded into a random-access memory (RAM) 1003 from a storage unit 1008. Various programs and data required for the operation of the electronic device 1000 are also stored in the RAM 1003. The computing unit 1001, the ROM 1002, and the RAM 1003 are connected to each other through a bus 1004. An input/output (I/O) interface 1005 is also connected to the bus 1004.

Multiple components in the electronic device 1000 are connected to the I/O interface 1005. The multiple components include an input unit 1006 such as a keyboard or a mouse, an output unit 1007 such as various types of displays or speakers, the storage unit 1008 such as a magnetic disk or an optical disk, and a communication unit 1009 such as a network card, a modem or a wireless communication transceiver. The communication unit 1009 allows the electronic device 1000 to exchange information/data with other devices over a computer network such as the Internet and/or various telecommunications networks.

The computing unit 1001 may be various general-purpose and/or special-purpose processing components having processing and computing capabilities. Examples of the computing unit 1001 include, but are not limited to, a central processing unit (CPU), a graphics processing unit (GPU), a special-purpose artificial intelligence (AI) computing chip, a computing unit executing machine learning models and algorithms, a digital signal processor (DSP), and any appropriate processor, controller and microcontroller. The computing unit 1001 executes various methods and processing described above, such as the method for training a three-dimensional face reconstruction model or the method for generating a three-dimensional face image. For example, in some embodiments, the method for training a three-dimensional face reconstruction model or the method for generating a three-dimensional face image may be implemented as a computer software program tangibly contained in a machine-readable medium such as the storage unit 1008. In some embodiments, part or all of computer programs may be loaded and/or installed onto the electronic device 1000 via the ROM 1002 and/or the communication unit 1009. When the computer programs are loaded into the RAM 1003 and performed by the computing unit 1001, one or more steps of the preceding method for training a three-dimensional face reconstruction model or the preceding method for generating a three-dimensional face image may be performed. Alternatively, in other embodiments, the computing unit 1001 may be configured, in any other suitable manner (for example, by relying on firmware), to perform the method for training a three-dimensional face reconstruction model or the method for generating a three-dimensional face image.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus, and transmitting data and instructions to the memory system, the at least one input apparatus, and the at least one output apparatus.

Program codes for implementation of the methods of the present disclosure may be written in one programming language or any combination of multiple programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, a server of a distributed system, or a server combined with a blockchain.

Artificial intelligence is the study of making computers simulate certain human thinking processes and intelligent behaviors (such as learning, reasoning, thinking, and planning) both at the hardware and software levels. Artificial intelligence hardware technologies generally include technologies such as sensors, special-purpose artificial intelligence chips, cloud computing, distributed storage, and big data processing. Artificial intelligence software technologies mainly include several major technologies such as computer vision technologies, speech recognition technologies, natural language processing technologies, machine learning/deep learning technologies, big data processing technologies, and knowledge mapping technologies.

Cloud computing refers to a technical system that accesses a shared elastic-and-scalable physical or virtual resource pool through a network, where resources may include servers, operating systems, networks, software, applications, and storage devices and may be deployed and managed in an on-demand, self-service manner. Cloud computing can provide efficient and powerful data processing capabilities for artificial intelligence, the blockchain and other technical applications and model training.

It is to be understood that various forms of the preceding flows may be used with steps reordered, added, or removed. For example, the steps described in the present disclosure may be executed in parallel, in sequence, or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement, and the like made within the spirit and principle of the present disclosure falls within the scope of the present disclosure.

What is claimed is:

1. A method for training a three-dimensional face reconstruction model, comprising:
    acquiring a sample face image and a stylized face map of the sample face image;
    inputting the sample face image into a three-dimensional face reconstruction model to obtain a coordinate transformation parameter and a face parameter of the sample face image;
    determining a three-dimensional stylized face image of the sample face image according to the face parameter of the sample face image and the stylized face map of the sample face image;
    transforming the three-dimensional stylized face image of the sample face image into a camera coordinate system based on the coordinate transformation parameter, and rendering the transformed three-dimensional stylized face image to obtain a rendered map; and
    training the three-dimensional face reconstruction model according to the rendered map and the stylized face map of the sample face image;
    wherein determining the three-dimensional stylized face image of the sample face image according to the face parameter of the sample face image and the stylized face map of the sample face image comprises:
    constructing a three-dimensional face image of the sample face image based on the face parameter of the sample face image; and
    processing the three-dimensional face image of the sample face image according to the stylized face map of the sample face image to obtain the three-dimensional stylized face image of the sample face image;
    wherein processing the three-dimensional face image of the sample face image according to the stylized face map of the sample face image to obtain the three-dimensional stylized face image of the sample face image comprises:

performing texture expansion on the stylized face map of the sample face image to obtain an initial texture map;

performing at least one of occlusion removal processing, highlight removal processing, or face pose adjustment processing on the initial texture map based on a map regression network to obtain a target texture map, wherein the map regression network is a pre-trained convolutional neural network for processing the initial texture map; and processing the three-dimensional face image of the sample face image according to the target texture map to obtain the three-dimensional stylized face image of the sample face image.

2. The method of claim 1, wherein acquiring the stylized face map of the sample face image comprises:

extracting a stylized feature from a stylized coding network;

inputting the sample face image into a face restoration coding network to obtain a face feature of the sample face image; and generating, based on a style map generation network, the stylized face map of the sample face image according to the stylized feature and the face feature of the sample face image.

3. The method of claim 1, wherein training the three-dimensional face reconstruction model according to the rendered map and the stylized face map of the sample face image comprises:

jointly training the three-dimensional face reconstruction model and the map regression network according to the rendered map and the stylized face map of the sample face image.

4. The method of claim 1, wherein training the three-dimensional face reconstruction model according to the rendered map and the stylized face map of the sample face image comprises:

extracting a stylized face region from the stylized face map of the sample face image;

adjusting a background color of the stylized face region according to a background color of the rendered map;

determining an image comparison loss according to the rendered map and the adjusted stylized face region; and training the three-dimensional face reconstruction model according to the image comparison loss.

5. The method of claim 1, wherein inputting the sample face image into the three-dimensional face reconstruction model to obtain the coordinate transformation parameter and the face parameter of the sample face image comprises:

inputting the sample face image into the three-dimensional face reconstruction model to obtain Euler angles, a translation transformation parameter and a scaling transformation parameter in the coordinate transformation parameter, and the face parameter of the sample face image; and correspondingly, transforming the three-dimensional stylized face image of the sample face image into the camera coordinate system based on the coordinate transformation parameter, and rendering the transformed three-dimensional stylized face image to obtain the rendered map comprises:

affinely transforming the three-dimensional stylized face image of the sample face image into the camera coordinate system based on the translation transformation parameter and the scaling transformation parameter; and rendering, based on a field of view of a camera and the Euler angles, the three-dimensional stylized face image subjected to the affine transformation to obtain the rendered map.

6. The method of claim 1, wherein the face parameter of the sample face image comprises a face shape parameter.

7. A method for generating a three-dimensional face image, comprising:

acquiring a target face image and a stylized face map of the target face image;

inputting the target face image into a three-dimensional face reconstruction model to obtain a face parameter of the target face image, wherein the three-dimensional face reconstruction model is obtained through training based on the method for training a three-dimensional face reconstruction model of claim 1; and determining a three-dimensional stylized face image of the target face image according to the face parameter of the target face image and the stylized face map of the target face image.

8. The method of claim 7, wherein acquiring the stylized face map of the target face image comprises:

extracting a stylized feature from the stylized coding network;

inputting the target face image into a face restoration coding network to obtain a face feature of the target face image; and generating, based on a style map generation network, the stylized face map of the target face image according to the stylized feature and the face feature of the target face image.

9. The method of claim 7, wherein determining the three-dimensional stylized face image of the target face image according to the face parameter of the target face image and the stylized face map of the target face image comprises:

constructing a three-dimensional face image of the target face image based on the face parameter of the target face image; and processing the three-dimensional face image of the target face image according to the stylized face map of the target face image to obtain the three-dimensional stylized face image of the target face image.

10. The method of claim 9, wherein processing the three-dimensional face image of the target face image according to the stylized face map of the target face image to obtain the three-dimensional stylized face image of the target face image comprises:

performing texture expansion on the stylized face map of the target face image to obtain a to-be-processed texture map;

performing at least one of occlusion removal processing, highlight removal processing, or face pose adjustment processing on the to-be-processed texture map based on the map regression network to obtain a processed texture map; and processing the three-dimensional face image of the target face image according to the processed texture map to obtain the three-dimensional stylized face image of the target face image.

11. The method of claim 7, wherein the face parameter of the target face image comprises a face shape parameter.

12. A non-transitory computer-readable storage medium storing a computer instruction, wherein the computer instruction is configured to cause a computer to execute the method for training a three-dimensional face reconstruction model of claim 7.

13. An electronic device, comprising:
at least one processor; and
a memory communicatively connected to the at least one processor,
wherein the memory stores an instruction executable by the at least one processor, and the instruction is executed by the at least one processor to cause the at least one processor to execute the following steps:
acquiring a sample face image and a stylized face map of the sample face image;
inputting the sample face image into a three-dimensional face reconstruction model to obtain a coordinate transformation parameter and a face parameter of the sample face image;
determining a three-dimensional stylized face image of the sample face image according to the face parameter of the sample face image and the stylized face map of the sample face image;
transforming the three-dimensional stylized face image of the sample face image into a camera coordinate system based on the coordinate transformation parameter, and rendering the transformed three-dimensional stylized face image to obtain a rendered map; and
training the three-dimensional face reconstruction model according to the rendered map and the stylized face map of the sample face image;
wherein determining the three-dimensional stylized face image of the sample face image according to the face parameter of the sample face image and the stylized face map of the sample face image comprises:
constructing a three-dimensional face image of the sample face image based on the face parameter of the sample face image; and
processing the three-dimensional face image of the sample face image according to the stylized face map of the sample face image to obtain the three-dimensional stylized face image of the sample face image;
wherein processing the three-dimensional face image of the sample face image according to the stylized face map of the sample face image to obtain the three-dimensional stylized face image of the sample face image comprises:
performing texture expansion on the stylized face map of the sample face image to obtain an initial texture map;
performing at least one of occlusion removal processing, highlight removal processing, or face pose adjustment processing on the initial texture map based on a map regression network to obtain a target texture map, wherein the map regression network is a pre-trained convolutional neural network for processing the initial texture map; and
processing the three-dimensional face image of the sample face image according to the target texture map to obtain the three-dimensional stylized face image of the sample face image.

14. The electronic device of claim 13, wherein acquiring the stylized face map of the sample face image comprises:
extracting a stylized feature from a stylized coding network;
inputting the sample face image into a face restoration coding network to obtain a face feature of the sample face image; and
generating, based on a style map generation network, the stylized face map of the sample face image according to the stylized feature and the face feature of the sample face image.

15. An electronic device, comprising:
at least one processor; and
a memory communicatively connected to the at least one processor, wherein the memory stores an instruction executable by the at least one processor, and the instruction is executed by the at least one processor to cause the at least one processor to execute the following steps:
acquiring a target face image and a stylized face map of the target face image;
inputting the target face image into a three-dimensional face reconstruction model to obtain a face parameter of the target face image, wherein the three-dimensional face reconstruction model is obtained through training based on the electronic device of claim 13; and
determining a three-dimensional stylized face image of the target face image according to the face parameter of the target face image and the stylized face map of the target face image.

16. A non-transitory computer-readable storage medium storing a computer instruction, wherein the computer instruction is configured to cause a computer to execute the following steps:
acquiring a sample face image and a stylized face map of the sample face image;
inputting the sample face image into a three-dimensional face reconstruction model to obtain a coordinate transformation parameter and a face parameter of the sample face image;
determining a three-dimensional stylized face image of the sample face image according to the face parameter of the sample face image and the stylized face map of the sample face image;
transforming the three-dimensional stylized face image of the sample face image into a camera coordinate system based on the coordinate transformation parameter, and rendering the transformed three-dimensional stylized face image to obtain a rendered map; and
training the three-dimensional face reconstruction model according to the rendered map and the stylized face map of the sample face image;
wherein determining the three-dimensional stylized face image of the sample face image according to the face parameter of the sample face image and the stylized face map of the sample face image comprises:
constructing a three-dimensional face image of the sample face image based on the face parameter of the sample face image; and
processing the three-dimensional face image of the sample face image according to the stylized face map of the sample face image to obtain the three-dimensional stylized face image of the sample face image;
wherein processing the three-dimensional face image of the sample face image according to the stylized face map of the sample face image to obtain the three-dimensional stylized face image of the sample face image comprises:
performing texture expansion on the stylized face map of the sample face image to obtain an initial texture map;
performing at least one of occlusion removal processing, highlight removal processing, or face pose adjustment processing on the initial texture map based on a map regression network to obtain a target texture map, wherein the map regression network is a pre-trained convolutional neural network for processing the initial texture map; and processing the three-dimensional face image of the sample face image according to the target texture map to obtain the three-dimensional stylized face image of the sample face image.

\* \* \* \* \*